United States Patent
Kulzer et al.

(10) Patent No.: US 11,559,933 B2
(45) Date of Patent: Jan. 24, 2023

(54) APPARATUS AND METHOD FOR FORMING PLASTIC PREFORMS INTO PLASTIC CONTAINERS AND BLOW MOULD

(71) Applicant: KRONES AG, Neutraubling (DE)

(72) Inventors: Markus Kulzer, Zell (DE); Juergen Soellner, Beratzhausen (DE); Thomas Spitzer, Wiesent (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/028,157

(22) Filed: Sep. 22, 2020

(65) Prior Publication Data

US 2021/0101325 A1 Apr. 8, 2021

(30) Foreign Application Priority Data

Oct. 8, 2019 (DE) ...................... 10 2019 126 948.2

(51) Int. Cl.
| | | |
|---|---|---|
| *B29C 49/48* | (2006.01) | |
| *B29C 33/56* | (2006.01) | |
| *A23P 30/10* | (2016.01) | |
| *B29C 49/28* | (2006.01) | |
| *B29C 49/56* | (2006.01) | |
| *B29L 31/00* | (2006.01) | |

(52) U.S. Cl.
CPC .............. *B29C 49/48* (2013.01); *A23P 30/10* (2016.08); *B29C 33/56* (2013.01); *B29C 49/28* (2013.01); *B29C 49/56* (2013.01); *B29C 2049/566* (2013.01); *B29K 2871/00* (2013.01); *B29L 2031/712* (2013.01)

(58) Field of Classification Search
CPC ................................ B29C 49/48; B29C 33/56

USPC ........................................ 249/102, 111, 114.1
See application file for complete search history.

(56) References Cited

U.S. PATENT DOCUMENTS 4,871,507 A * 10/1989 Ajmera ............... B29C 49/4823
264/521
5,041,247 A 8/1991 Kim
(Continued)

FOREIGN PATENT DOCUMENTS

FR 2750638 1/1998
JP 5428727 3/1979
(Continued)

OTHER PUBLICATIONS

Partial machine translation of JP 08-118367 A dated May 1996 obtained from the espace website. (Year: 1996).*
(Continued)

*Primary Examiner* — Robert B Davis
(74) *Attorney, Agent, or Firm* — Onello & Mello, LLP

(57) ABSTRACT

Apparatus (1) for forming plastic preforms (10) into plastic containers (20). In a closed state of a blow mould (14), a contact area is formed between side parts (14*a*, 14*b*), in which the two side parts (14*a*, 14*b*) rest against each other, the side parts (14*a*, 14*b*) form a mould separation seam (5) in the contact area. In accordance with the invention, at least one section of at least one side part (14*a*, 14*b*) has a coating and/or an additional element (60) in a region of the mould separation seam (5), so that a heat transfer between the plastic preform (10) and the inner wall (52, 54) in the contact area can be delayed at least in places at these at least one section.

15 Claims, 3 Drawing Sheets

(56) References Cited

U.S. PATENT DOCUMENTS

Figure 1:
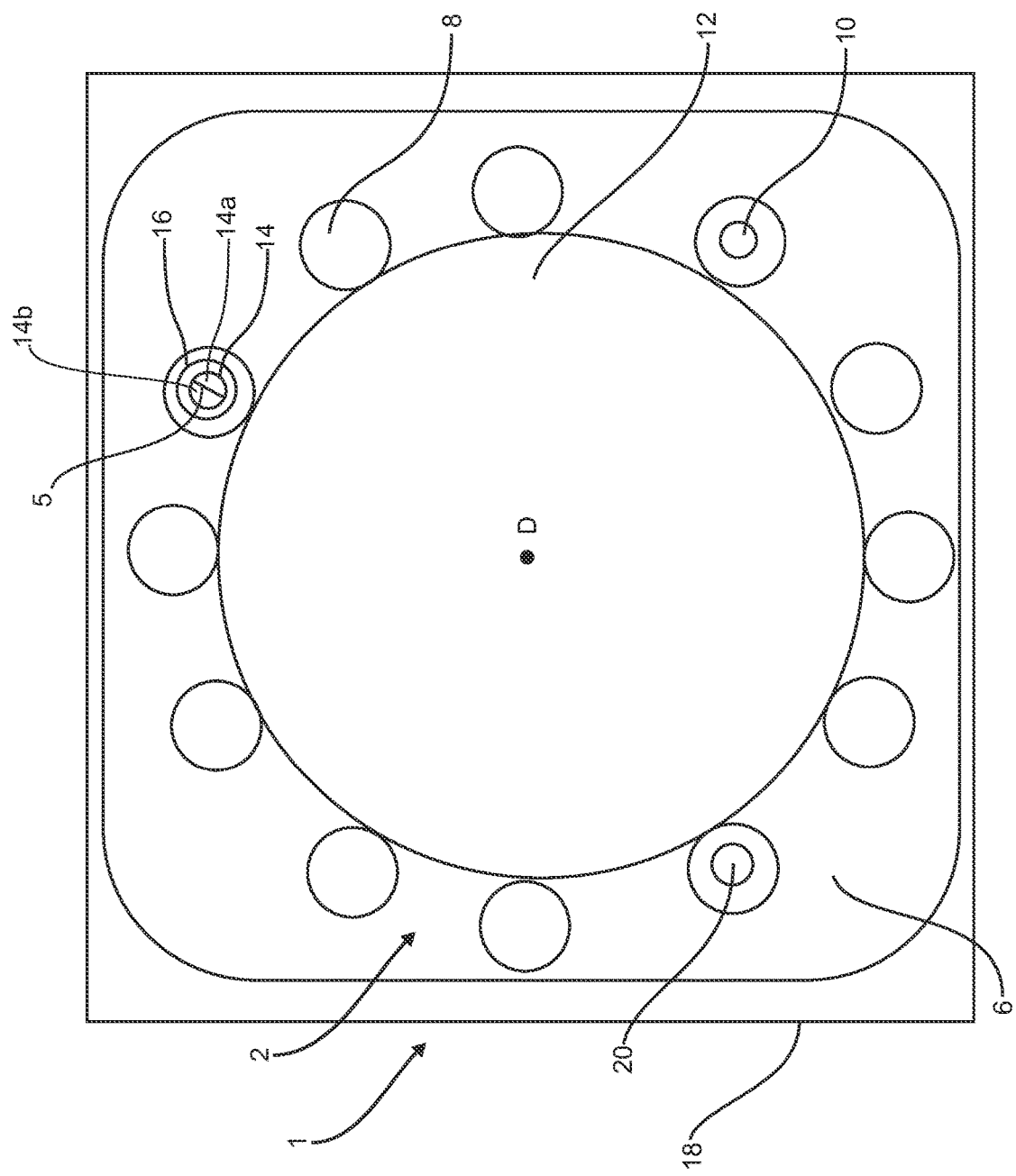

| | | | |
|---|---|---|---|
| 5,993,721 A * | 11/1999 | Kurihara | B29C 49/20 |
| | | | 264/402 |
| 8,333,581 B2 | 12/2012 | Langlois | |
| 8,632,325 B2 * | 1/2014 | Voth | B65B 55/08 |
| | | | 425/522 |
| 2011/0052743 A1 | 3/2011 | Langlois | |
| 2017/0050361 A1 * | 2/2017 | Kato | B29C 45/26 |
| 2019/0009451 A1 * | 1/2019 | Philipp | B29C 49/48 |

FOREIGN PATENT DOCUMENTS

| | | | | |
|---|---|---|---|---|
| JP | 07276484 | | 10/1995 | |
| JP | 08118367 A | * | 5/1996 | ......... B29C 33/3828 |

OTHER PUBLICATIONS

Extended European Search Report dated Mar. 3, 2021 issued in corresponding European Application No. 20200375.2.

* cited by examiner

APPARATUS AND METHOD FOR FORMING PLASTIC PREFORMS INTO PLASTIC CONTAINERS AND BLOW MOULD

The present invention relates to an apparatus and a process for forming plastic preforms into plastic containers and to a blow mould for forming plastic preforms into plastic containers. Such apparatus and processes have long been known from the state of the art. The plastic preforms are usually placed in a blow mould of a blowing machine. Inside this blow mould, the plastic preforms are then formed into plastic containers by applying a free-flowing and especially gaseous medium, such as compressed air, and stretching them with a stretching rod by pressing the plastic preforms against the inner walls of the blow mould. More recently, it has also been adopted to form the plastic preform together with the liquid product to be filled instead of the gaseous medium.

The above-mentioned blow mould is usually composed of two side parts and a bottom mould, which in the closed state form a cavity, which is decisive for the shape of the plastic containers to be produced and accordingly represents a negative mould of the plastic containers to be moulded. The stretch blow moulding process usually consists of several pressure phases in which the plastic preforms are subjected to different pressures, the levels of the individual pressures in the pressure phases differing from one another.

Particularly during the high-pressure phase, there is a risk of deformation and/or movement of the two side parts of the blow mould, which can lead to a deterioration of the so-called parting line. The parting line is created by a mould separation seam, at a contact area where the two side parts touch each other in a closed state, on the finished plastic container and is visible as a fine continuous line along the entire longitudinal direction of the container on the finished plastic container.

Especially with smooth-walled (flat, non-curved surfaces) PET containers, the deformation and/or movement of the two side parts of the blow mould can cause the parting line to collapse towards the centre of the bottle, making the containers appear out of round or uneven.

The present invention is therefore based on the task of providing an apparatus and a process by means of which such an impairment of the plastic container during blow moulding can be avoided. Furthermore, the present invention is also based on the task of providing a blow mould suitable for this purpose. According to the invention this task is achieved by the objects of the independent claims. Advantageous embodiments forms and further training are the subject of the sub-claims.

The invention is therefore directed towards an apparatus for forming plastic preforms into plastic containers, having at least one forming station which has a blow mould within which the plastic preforms can be expanded into the plastic containers by exposure to a flowable and in particular gaseous medium. Furthermore, the apparatus has a loading device which loads the plastic preforms with the flowable medium for their expansion. The blow mould is to constructed in several parts and has at least a first side part and a second side part which are movable relative to one another for opening and closing the blow mould, the first side part and the second side part each having an inner wall against which the plastic preforms can be expanded, wherein in a closed state of the blow mould a contact area is formed between the side parts in which the two side parts lie against each other, the side parts forming a mould separation seam in the contact area.

In accordance with the invention, at least one section of at least one side part has a coating and/or an additional element in a region of the mould separation seam, so that a heat transfer between the plastic preform and the inner wall in the contact region can be delayed at least in places at these at least one section.

According to the invention, it is therefore proposed to delay (minimally) the heat transfer at the blow moulds in the area of the parting lines or the mould parting line. In particular, it is proposed to delay the heat transfer during the forming of plastic preforms into plastic containers at the contact area of the side parts between the plastic preform and the inner walls of the side parts by applying special coatings in this area in such a way that no different stress ratios within the walls of the plastic containers can become apparent which would lead to collapse at the parting line.

By delaying the heat transfer at the blow moulds in the area of the mould parting line, a higher quality parting line can be achieved without impairing the overall cooling effect.

In particular, the coating in at least one section of a side part in the area of the mould separation seam allows the cooling of the formed plastic container to be delayed at least in places and is particularly preferable to other areas of the inner wall of the side parts. In the case of the mould separation seam, this is in particular also a mould gap which the side parts form in the contact area in a closed state of the blow mould.

Particularly preferably, at least one section of each of the two side parts has a coating in a region of the mould parting line, so that a heat transfer between the plastic preform and the inner wall of the mould parting line can be delayed at least in places on these at least one sections.

It would also be conceivable, instead of the coating, to introduce an additional element, in particular a plastic element, into at least a section of the inner wall of at least one side part and preferably both side parts in such a way that in this area a heat transfer between the plastic preform and the inner wall in the contact area can be delayed at least in places in such a way that no different stress conditions can be observed within the wall of the plastic container.

The present invention is therefore also directed towards an apparatus for forming plastic preforms into plastic containers of the type described above, wherein according to the invention an additional element and in particular a plastic element is provided in at least one section of at least one side part in an area of the mould separation seam, so that at these at least one section a heat transfer between the plastic preform and the inner wall in the contact area and in particular a cooling of the formed plastic container can be delayed at least in places.

The apparatus for forming plastic preforms into plastic containers is preferably a blow moulding machine or a stretch blow moulding machine. With an advantageous embodiment, a large number of forming stations are arranged on a common movable carrier. This carrier is in particular a rotatable carrier. For charging the plastic preforms, the device preferably has a blow nozzle which can be placed at a mouth of the plastic preforms in order to charge the plastic preforms with blow air or with a liquid, such as in particular a beverage to be filled, or to expand them by means of blow air. In addition, a valve arrangement is preferably also provided which controls the supply of the blowing air to the plastic preform.

In another advantageous embodiment, the forming stations each have stretching rods which stretch the plastic preforms in their longitudinal direction. The blow moulding machine or rather the carrier and the forming stations are arranged within a clean room, which separates the blow moulding machine from a non-sterile environment. Drive devices for closing, locking and/or opening the blow moulds are preferably located outside the clean room.

The forming stations are preferably transported within the clean room, whereby the clean room is preferably limited by several walls. Preferably, the clean room is bounded by at least one upright wall and one wall moving opposite this upright wall. For example, the carrier on which the forming stations or blow moulds are arranged may already have or form one of these walls and in particular the moving wall. The clean room separates the blow moulds from a non-sterile environment.

Preferably a feeding device is arranged upstream of the apparatus for forming plastic preforms into plastic containers in order to feed the plastic preforms to the forming stations and preferably a discharge device is arranged downstream in order to discharge the formed plastic containers from the forming stations. The feeding device and the discharge device are preferably transport wheels, transport stars or the like.

The blow mould has advantageously at least a first blow mould carrier and a second blow mould carrier for receiving the side parts, which can be pivoted against each other, preferably parallel to the longitudinal axis of the blow mould, for opening and closing the blow mould carriers. Preferably an interior of the blow mould in a closed state forms a cavity within which the plastic preforms can be formed into the plastic containers, this cavity preferably corresponding to a negative mould of the plastic containers to be produced.

Furthermore, the blow mould preferably comprises, in addition to the first side part and the second side part, also a bottom part which is suitable and intended to form a standing area of the formed plastic container. Preferably, a bottom support is also provided to accommodate the bottom part.

Upstream of the apparatus for forming plastic preforms into plastic containers, there is preferably a heating device for heating the plastic preforms, which preferably heats the plastic preforms to a temperature required for blow moulding.

In a preferred embodiment, an entire inner wall of at least one side part has a coating, so that on at least one side part a heat transfer between the plastic preform and the inner wall can be delayed at least in places in the contact area. Particularly preferably the entire inner wall of both side parts is provided with a coating, so that a heat transfer between the plastic preform and the inner wall in the contact area can be retarded at least in places. It would also be conceivable to provide the bottom part with such a coating.

Before the coating process, it is necessary to subject the side panel(s) to a special treatment to ensure that the coating adheres to the inner walls of the side panels. In particular, it is necessary to degrease the side panels thermally or chemically and to remove oxide layers. In order to further increase the adhesion of the coating, the side panels can preferably be further sandblasted. Hardening of the applied coating is preferably done by a sintering process.

In another preferred embodiment, the forming station has a locking mechanism for locking the blow mould and especially the side parts of the blow mould. The side and bottom parts of the blow mould are locked together by the locking mechanism, or the side and bottom parts of the blow mould can be locked together by the locking mechanism. The forming process takes place particularly preferably in a locked state of the blow mould or the forming station. It is advantageous to open the locking mechanism again after the formed plastic container has cooled down so that the finished plastic container can be removed from the blow mould.

The coating is produced in a preferred embodiment using a sol-gel process. In another preferred embodiment, the coating contains PEEK (polyetheretherketone) and, particularly preferred, PEEK and certain additives which influence the properties of the coated surface in the desired way.

Accordingly, a coating or a paint or a plastic element is applied particularly preferably to at least one section of at least one side part, by means of which a heat transfer between the plastic preform and the inner wall or a cooling of the formed plastic container in the contact area can be delayed at least in places.

The plastic element can also be advantageously combined with the coating and/or the lacquering, so that a coating and/or lacquering and a plastic element are applied to at least one section of at least one side part, by which/by which a heat transfer between the plastic preform and the inner wall or a cooling of the formed plastic container in the contact area can be delayed at least in places.

In another preferred embodiment, the forming station is designed without pressure pads. The side parts of the blow mould or the forming station are therefore only pressed together by the pivoting movement towards each other and the locking mechanism and are thus held together.

In a preferred embodiment, the coating has a layer thickness which is greater than 10 μm, preferably greater than 20 μm and particularly preferably greater than 30 μm and/or the coating has a layer thickness which is less than 100 μm, preferably less than 80 μm, preferably less than 60 μm.

It is advantageous for the side parts to be used at a temperature after coating which is higher than −50° C., preferably higher than 30° C., preferably higher than 100° C. and particularly preferably higher than 200° C. and/or the temperature is lower than 400° C., preferably lower than 350° C. and particularly preferably lower than 280° C. Particularly preferred is the application temperature of the side parts after coating in a range between −40° C. and 260° C.

In another advantageous embodiment, the coating is a food-compatible coating and/or a solvent-resistant coating. Preferably, the coating is non-sticky compared to plastics. The coating is therefore particularly preferred to be a food-compatible and/or solvent-resistant coating and is designed in such a way that it is non-adhesive to plastics.

The present invention is further directed towards a blow mould for forming plastic preforms into plastic containers, wherein the blow mould is constructed in several parts and has at least a first side part and a second side part which are movable relative to each other for opening and closing the blow mould, wherein the first side part and the second side part each have an inner wall against which the plastic preforms can be expanded, wherein in a closed state of the blow mould a contact area is formed between the side parts in which the two side parts lie against each other, wherein the side parts form a mould separation seam in the contact area.

In accordance with the invention, at least one section of at least one side part in a region of the mould separation seam has a coating and/or an additional element, such as in particular a plastic element, so that at these at least one section a heat transfer between the plastic preform and the inner wall in the contact region can be delayed at least in places.

Accordingly, a blow mould is also proposed which is provided with a coating and/or an additional element in such a way that heat transfer at the blow moulds is delayed in the area of the contact area or the mould parting line, so that in particular a collapse of the parting line at the formed plastic container is prevented.

In addition, the present invention is also directed to a process for forming plastic preforms into plastic containers, with at least one forming station, which has a blow mould, within which the plastic preforms are expanded into the plastic containers by being acted upon by a flowable and in particular gaseous medium, with a loading device which loads the plastic preforms with the flowable medium for their expansion, wherein the blow mould is constructed in several parts and has at least a first side part and a second side part which are movable relative to one another for opening and closing the blow mould.

The first side part and the second side part each have an inner wall against which the plastic preforms are expanded, whereby in a closed state of the blow mould a contact area is formed between the side parts in which the two side parts lie against each other, whereby the side parts form a mould separation seam in the contact area. Preferably this mould separation seam runs in a straight line and extends in particular in or along the (vertical) longitudinal direction of the blow mould, in the upright position of the blow mould.

In accordance with the invention, at least one section of at least one side part in a region of the mould separation seam has a coating and/or an additional element, such as in particular a plastic element, so that at these at least one section a heat transfer between the plastic preform and the inner wall in the contact region is delayed at least in places.

It is therefore also proposed on the process side to provide at least one section of an inner wall of a side part in the area of the mould parting line with a coating so that heat transfer to the blow moulds in the area of the contact area or the mould parting line is delayed, so that in particular collapse of the parting line on the moulded plastic container is prevented.

Further advantages and embodiments will be apparent from the attached figures.

Figure 2:
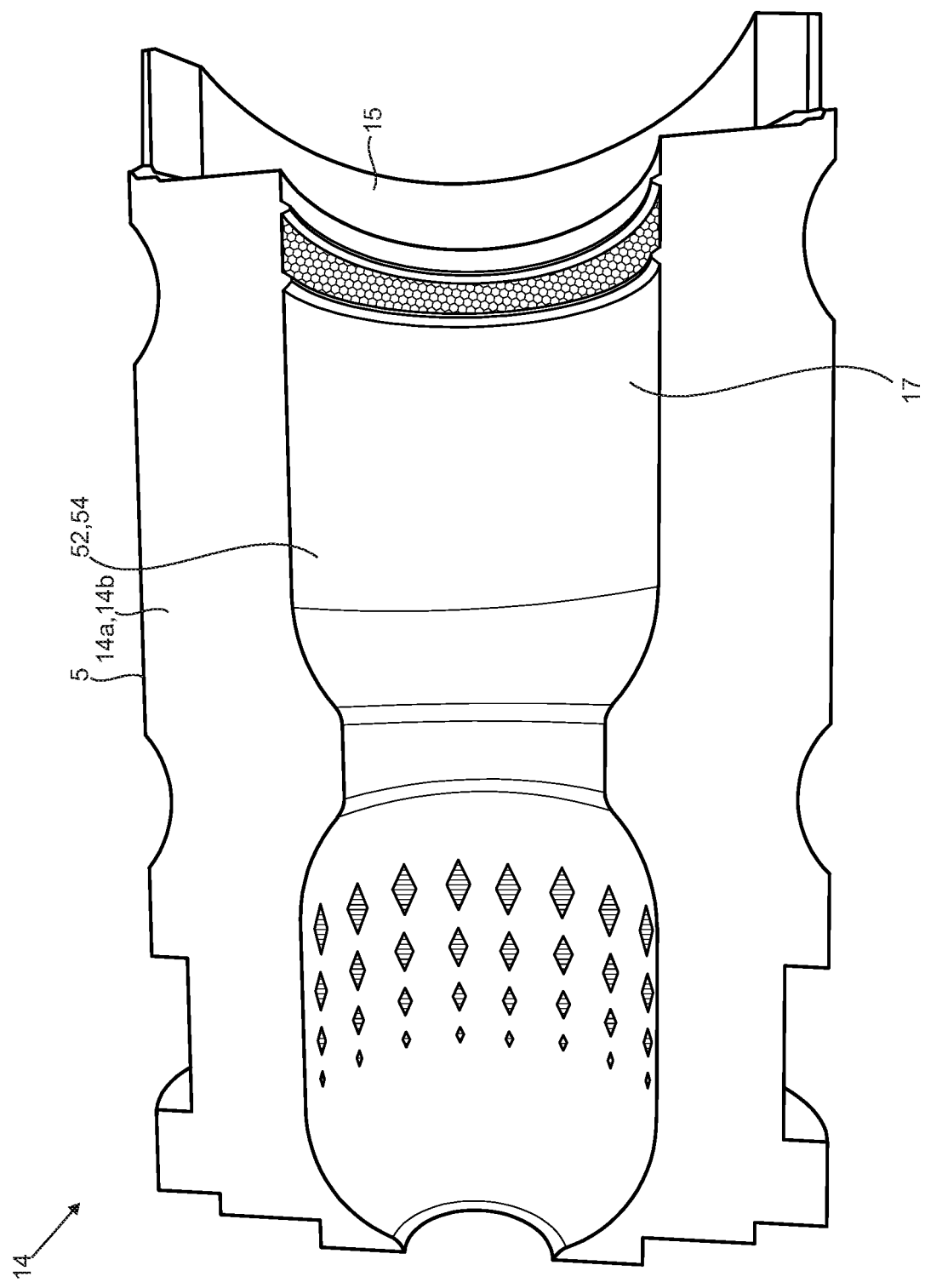
Figure 3:
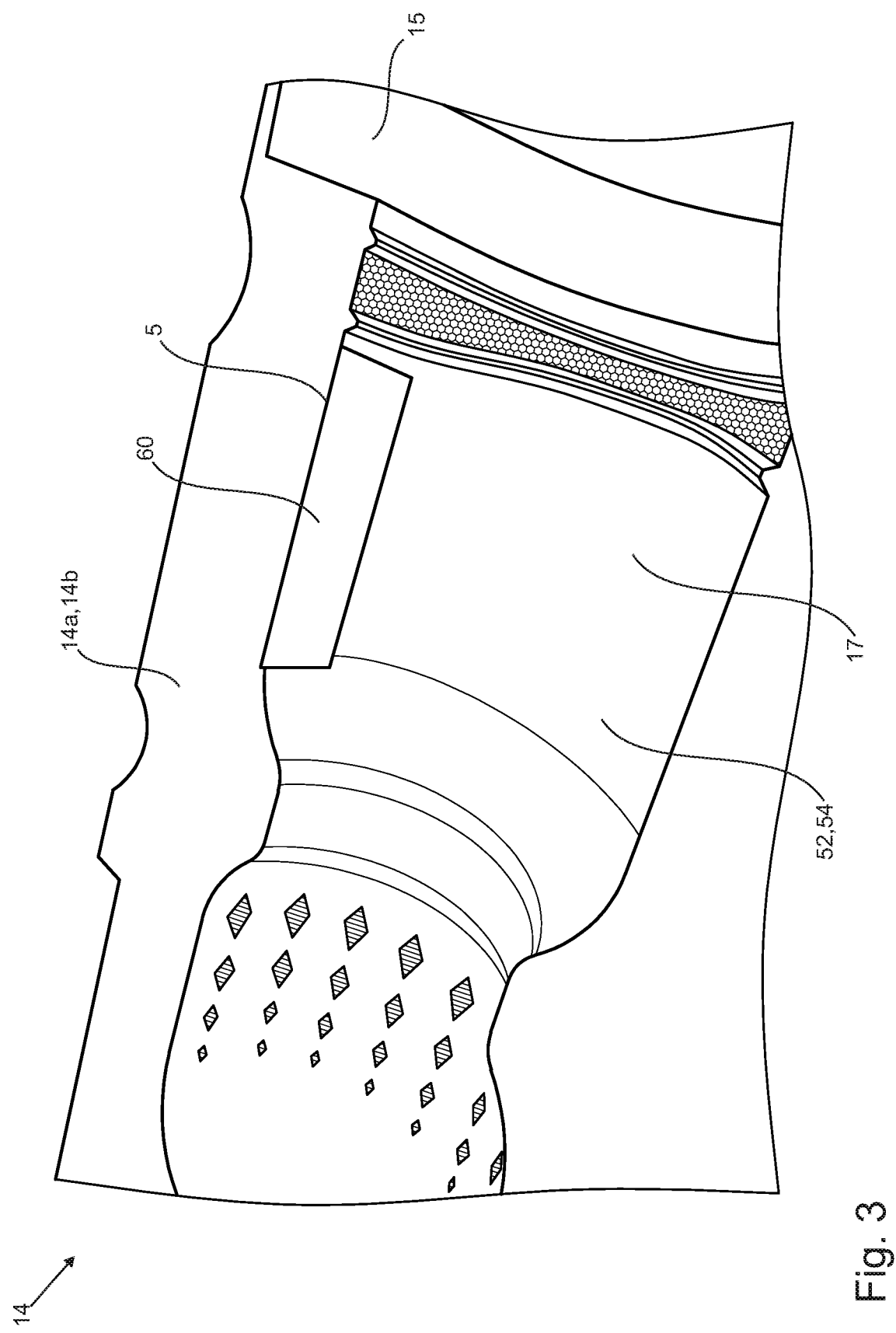

It is shown:

FIG. 1 a schematic representation of an apparatus, according to the invention, for forming plastic preforms into plastic containers;

FIG. 2 a first embodiment, according to the invention, of a side part of a blow mould with coating; and FIG. 3 a second embodiment form, according to the invention, of a side part of a blow mould with a plastic element.

FIG. 1 shows a schematic diagram of an apparatus 1 for forming plastic preforms 10 into plastic containers 20, whereby the plastic preforms 10 are fed to the individual forming stations 8 and, preferably while being transported by a transport device 2, expanded into plastic containers 20. After this expansion, the plastic containers 20 are taken out of the apparatus 1 again. For this purpose a (not shown) feeding star can be provided which feeds the plastic preforms to the apparatus 1, as well as a (likewise not shown) discharge device, in particular also a transport star, which discharges the finished plastic containers 20 from the apparatus again.

The apparatus 1 has a station carrier 12 on which a large number of forming stations 8 are arranged. This station carrier can be, for example, as shown in FIG. 1, a blowing wheel which can be rotated with respect to an axis of rotation D (which here is perpendicular to the plane of the figure and thus vertical). Each individual forming station 8 has a blow mould 14, which preferably consists of two side parts 14a, 14b and a (not shown) bottom mould. The blow moulds 14 are arranged on blow mould carriers 16 and can be removed from them or arranged on them.

The reference mark 6 indicates a base support on which the station support 12 is rotatably mounted. The reference mark 18 indicates a housing which at least partially surrounds the station carrier 12. Preferably the housing 18 separates its interior, which is designed as a sterile or clean room, from a normal atmosphere.

The reference mark 5 refers to a mould separation seam, which is formed between the side parts 14a and 14b when the blow mould 14 is closed and is visible as a so-called parting line on the moulded plastic container 20.

FIG. 2 shows a first inventive embodiment of a side part 14a, 14b of a blow mould with coating. In this embodiment, the entire inner wall 52, 54 of the side part 14a, 14b is provided with a coating. However, as described above, it would also be conceivable that only a section of this inner wall 52, 54 is coated, in particular in the area of a contact area where, when closed, both side parts touch and form a mould separation seam 5.

When the side parts 14a, 14b are closed, the contour of the inner wall 52, 54 also creates a cavity 17 inside the blow mould, which corresponds in particular to a negative mould of the plastic container to be moulded. The reference mark 15 identifies a section in which a (not shown) base mould is arranged or suspended.

FIG. 3 shows a second, invention-related embodiment of a side part 14a, 14b of a blow mould with a plastic element 60, the plastic element or additional element 60 being arranged on a section of the inner wall 52, 54 of the side part 14a, 14b in an area which, together with the second side part, forms a mould separation seam 5 when the blow mould is closed.

The contour of the inner wall 52, 54 forms a cavity 17 in a closed state of the side parts, which corresponds to a negative form of the plastic container to be formed. The reference mark 15 again indicates the section 15 in which a (not shown) base mould is arranged or suspended.

It would preferably also be conceivable that the coating according to FIG. 2 and the plastic element according to FIG. 3 are also used in combination and therefore at least one side part 14a, 14b of a blow mould has a coating according to the invention in at least one first section and has a plastic element according to the invention in at least one second section which differs from the first section.

The applicant reserves the right to claim all features disclosed in the application documents as being essentially inventive, provided that they are, individually or in combination, new compared to the prior art. It is further pointed out that the individual figures also describe features which may be advantageous in themselves. The skilled person recognises immediately that a certain feature described in a figure can be advantageous even without adopting further features from that figure. Furthermore, the skilled person recognises that advantages may also result from a combination of several features shown in individual or different figures.

LIST OF REFERENCE SIGNS 1 apparatus
2 transport equipment
5 mould separation seam
6 base support 8 forming station
10 plastic preform
12 station carrier
14 blow mould
14a first side part
14b second side part
15 section
16 blow mould carrier
17 cavity
18 housing
20 plastic container
52 inner wall of the first side part 14a
54 inner wall of the second side panel 14b
60 plastic element, additional element
D axis of rotation

The invention claimed is:

1. Apparatus (1) for forming plastic preforms (10) into plastic containers (20), having at least one forming station (8) which has a blow mould (14) within which the plastic preforms (10) can be expanded into the plastic containers (20) by being acted upon by a flowable medium, with a loading device which loads the plastic preforms (10) with the flowable medium for their expansion, the blow mould (14) is a multi-part blow mould and has at least a first side part (14a) and a second side part (14b), which are movable relative to one another for opening and closing the blow mould, wherein the first side part (14a) and the second side part (14b) each have an inner wall (52, 54) against which the plastic preforms (10) can be expanded, wherein in a closed state of the blow mould (14), a contact area is formed between the side parts (14a, 14b), in which the two side parts (14a, 14b) rest against each other, the side parts (14a, 14b) form a mould separation seam (5) in the contact area, characterised in that at least one section of at least one side part (14a, 14b) has a coating in a region of the mould separation seam (5), so that a heat transfer between the plastic preform (10) and the inner wall (52, 54) in the contact area can be delayed at least in places at these at least one section, wherein the coating has a layer thickness which is greater than 10 μm and/or that the coating has a layer thickness which is less than 100 μm and the coating is a food-compatible coating and a solvent-resistant coating and the coating is non-adhesive to plastics, wherein the forming station is designed without pressure pads.

2. Apparatus (1) according to claim 1, characterised in that the forming station (8) has a locking mechanism for locking the blow mould (14).

3. Apparatus (1) according to claim 1, characterised in that an entire inner wall (52, 54) of at least one side part (14a, 14b) has a coating.

4. Apparatus (1) according to claim 3, characterised in that the coating is produced with a sol-gel process.

5. Apparatus (1) according to claim 3, characterised in that the coating contains PEEK.

6. Apparatus (1) according to claim 1, characterised in that the coating has a layer thickness which is greater than 20 μm and/or that the coating has a layer thickness which is less than 80 μm.

7. Blow mould (14) for forming plastic preforms (10) into plastic containers (20), the blow mould (14) is a multi-part blow mould and has at least a first side part (14a) and a second side part (14b) which can be moved relative to one another for opening and closing the blow mould (14), the first side part (14a) and the second side part (14b) each having an inner wall (52, 54) against which the plastic preforms (10) can be expanded, wherein in a closed state of the blow mould (14) a contact area is formed between the side parts (14a, 14b) in which the two side parts (14a, 14b) rest against each other, wherein the side parts (14a, 14b) form a mould separation seam (5) in the contact area, characterised in that at least one section of at least one side part (14a, 14b) has a coating in a region of the mould separation seam (5), so that a heat transfer between the plastic preform (10) and the inner wall (52, 54) in the contact area can be delayed at least in places at these at least one section, wherein the coating has a layer thickness which is greater than 10 μm and/or that the coating has a layer thickness which is less than 100 μm and the coating is a food-compatible coating and a solvent-resistant coating and the coating is non-adhesive to plastics, wherein the forming station is designed without pressure pads.

8. Apparatus (1) for forming plastic preforms (10) into plastic containers (20), having at least one forming station (8) which has a blow mould (14) within which the plastic preforms (10) can be expanded into the plastic containers (20) by being acted upon by a flowable medium, with a loading device which loads the plastic preforms (10) with the flowable medium for their expansion, the blow mould (14) is a multi-part blow mould and has at least a first side part (14a), a second side part (14b), and a bottom mould, which are movable relative to one another for opening and closing the blow mould, wherein the first side part (14a), the second side part (14b), and the bottom mould each have an inner wall (52, 54) against which the plastic preforms (10) can be expanded, wherein in a closed state of the blow mould (14), a contact area is formed between the side parts (14a, 14b), in which the two side parts (14a, 14b) rest against each other, the side parts (14a, 14b) form a mould separation seam (5) in the contact area, characterised in that at least one section of at least one side part (14a, 14b) has an additional element (60), wherein the additional element is a plastic element which is arranged on a section of the inner wall of the side part in an area which, together with the second side part, forms a mould separation seam when the blow mould is closed, wherein the forming station is designed without pressure pads.

9. Apparatus according to claim 1, characterised in that the coating has a layer thickness which is greater than 30 μm and/or that the coating has a layer thickness which is less than 60 μm.

10. Apparatus according to claim 1, characterised in that the forming station has a locking mechanism for locking the side parts of the blow mould.

11. Apparatus according to claim 1, characterised in that the blow mould also comprises a bottom part which is suitable and intended to form a standing area of the formed plastic container and a bottom support to accommodate the bottom part, wherein the bottom part is provided with a coating.

12. Apparatus according to claim 1, characterised in that at least one section of each of the two side parts has a coating in a region of the mould parting line, so that a heat transfer between the plastic preform and the inner wall of the mould parting line can be delayed at least in places on these at least one sections.

13. Apparatus according to claim 1, characterised in that the apparatus for forming plastic preforms into plastic containers is a stretch blow moulding machine, which has a large number of forming stations arranged on a carrier.

14. Apparatus according to claim 13, characterised in that the forming stations each have stretching rods which stretch the plastic preforms in their longitudinal direction.

15. Apparatus according to claim 13, characterised in that the forming stations are transported within a clean room which is limited by several walls.

* * * * *